May 15, 1956 — R. W. ROCHON — 2,745,282
GAS LOGGING OF WELLS
Filed March 2, 1953
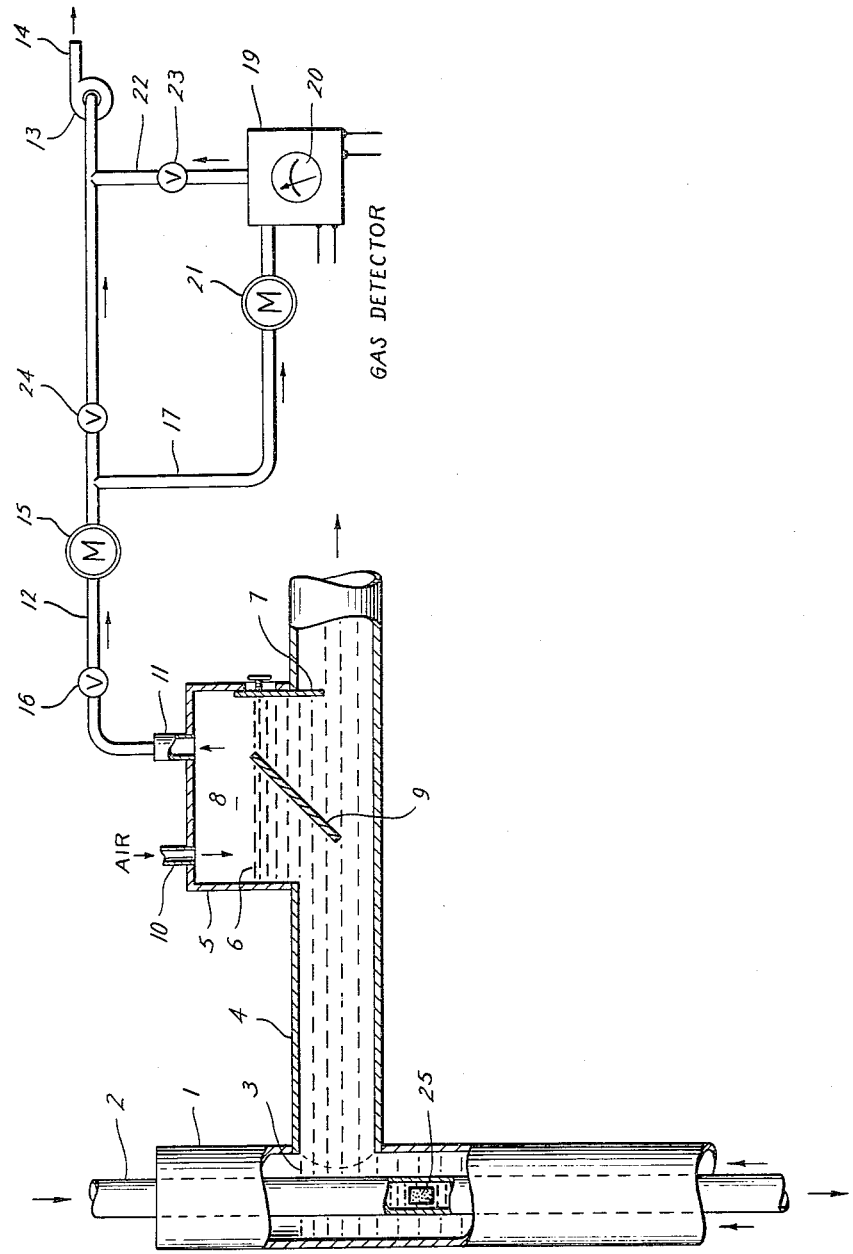
Robert W. Rochon
INVENTOR.
BY
ATTORNEY

United States Patent Office 2,745,282
Patented May 15, 1956

2,745,282

GAS LOGGING OF WELLS

Robert W. Rochon, San Antonio, Tex., assignor to Monarch Logging Company, Inc., San Antonio, Tex., a corporation of Texas Application March 2, 1953, Serial No. 339,781

5 Claims. (Cl. 73—153)

This invention relates to a method of logging wells during the drilling thereof, and particularly to a method of logging gas-containing strata in a well being drilled by the rotary method.

There is now in extensive use the method of logging wells during the rotary drilling thereof in which a stream of drilling fluid is circulated through the well, and in which the increments of the fluid leaving the well are analyzed for the contents of the strata dispersed therein by the drill at the bottom of the well, the increments being correlated with the depths of such strata. This general method was described in detail in J. T. Hayward U. S. Patent No. 2,214,674, September 10, 1940.

One particularly important phase of the general method is the analysis of the increments of the drilling fluid for the presence of gas in order to log the gas-containing strata encountered by the drill. One widely used method of detection and analysis for gas in the drilling fluid is described in J. T. Hayward U. S. Patent No. 2,489,180, November 22, 1949. In this method of gas detection the returning drilling fluid is passed through a trap or separator attached to the drilling fluid return line wherein gas carried by the successive increments of the drilling fluid is allowed to evolve from the fluid and is separated therefrom. The separated gas is continuously mixed with air and a constant volume of the air-gas mixture is then passed through a gas detector of the well-known "hot filament" type by which the percentage of combustible gas in the mixture may be continuously determined.

This method of gas detection is highly useful for logging purposes, since it shows the variations in gas content from increment to increment of the drilling fluid, and thereby provides an indication of the penetration of a gas stratum by the drill. However, this method and other existing methods known to me for examining the drilling fluid return as presently practiced, do not provide an accurate measure of the quantity of gas which may in fact be present in a formation. They merely indicate that successive increments of the drilling fluid evolve more or less gas without establishing any acceptable quantitative relation to the actual gas content of the particular strata to which the increments are related.

I have found that this short-coming of existing methods arises from the failure of those skilled in the art to recognize the importance of determining a relationship between the quantity of gas evolved from an increment of the drilling fluid and the total quantity of gas originally present in the increment.

I have found that the quantity of gas evolved from a gas-containing increment of the drilling fluid will depend not only on the quantity of gas originally introduced into the increment by the drilling of a gas stratum but also on the gas-holding or gas-releasing properties of the fluid. The viscosity, gel-strength and thixotropic properties of the drilling fluid all are factors which determine the quantity of gas which will be released from the drilling fluid.

Thus, in the absence of some suitable standard of comparison, the mere measurement of the quantity of gas released in the trap by an increment of the mud will have no significant relation to the gas-content of the stratum responsible for the gas in the increment. Nearly all conventional drilling fluids will retain the larger proportion of the gas originally introduced therein by the drilling of a gas-stratum and will release only a relatively small proportion of the gas at the surface. I have found that the proportion of the gas retained will be substantially constant for a given drilling fluid, and the proportion of gas released will, therefore, provide a measure of the amount of gas originally introduced into the drilling fluid and, accordingly, of the relative richness of the gas stratum.

In order to provide the necessary standard of comparison which will render the gas detector readings meaningful of the relative richness of the gas strata penetrated by the drill, the present invention contemplates among its principal objects, a method of calibrating the gas trap in terms of the quantity of gas released from a given drilling fluid containing a known volume of gas.

This calibration is accomplished by introducing into an increment of the drilling fluid chemicals which will react with the constituents of the drilling fluid to form, in situ, a known volume of gas in the increment. The fluid containing the known quantity of gas thus introduced therein is then passed through the trap in which the void space in the trap is of pre-determined volume. The gas evolved in the trap is mixed with air and a metered amount of the air-gas mixture per unit of time is drawn from the trap through a hot filament detector which is calibrated to read the percent of gas to air in the mixture. From this reading the volume of gas aerated in the trap and its percentage relative to the total gas in the fluid may be readily determined. With the trap so calibrated, the gas amplitudes recorded from drilling fluid of known gas-content may be directly compared with the gas amplitudes recorded from gas in strata of unknown characteristics and thereby provide a quantitative index of the gas content of the unknown strata.

The trap may be calibrated with a number of different drilling fluids having the various physical and chemical properties commonly employed in well drilling to provide appropriate standards of comparison for the gas recordings from each of such fluids when employed in drilling a well.

The various objects and advantages of this invention will become more readily apparent from the following detailed description when read in conjunction with the drawing which illustrates more or less diagrammatically an arrangement of apparatus useful for the practice of the present invention.

Referring to the drawing, the numeral 1 designates a section of the ordinary surface casing extending into a well which is being drilled by the well-known rotary method. A hollow drill pipe 2 extends axially of the casing to the bottom of the well turning the usual drill bit, not shown, in the conventional manner. Hydraulic fluid 3 such as the mud slurry commonly employed in such well drilling is circulated through the well in the usual manner through the interior of the drill pipe to the bottom of the well and thence back to the surface through the annular space between the drill pipe and the casing.

The drilling fluid will ordinarily comprise a suspension of clay solids in a vehicle such as water and will usually include weighting materials such as barytes, iron oxide and the like to increase the specific gravity of the fluid in order to maintain a hydrostatic pressure on the strata traversed by the well bore which is greater than the pressure of the connate fluids in the traversed strata. The drilling fluid will also ordinarily include materials such as bentonite to regulate the gel strength of the fluid and to control its thixotropic character. Other materials may also be incorporated in the drilling fluid to give it the various properties desired for such fluids.

The fluid flowing upwardly from the bottom of the well will pick up the cuttings produced there by the action of the drill bit and will carry such cuttings together with any naturally contained gas or other fluids to the surface and thence through a drilling fluid discharge pipe or conduit 4 which conveys the drilling fluid and cuttings to the usual screen or settling pits, not shown, and thence back to the suction of the conventional fluid circulating pump, not shown. The portions of the apparatus described but not shown are well-known and their construction and functions well understood by those skilled in the art and, therefore, are not further elaborated or illustrated.

A hollow gas collecting chamber or trap 5 constructed of metal or other suitable rigid material is mounted on top of conduit 4 at a point spaced from the juncture of conduit 4 with casing 3, the lower end of the trap being in open communication with the interior of the conduit. Drilling fluid 3 flows through conduit 4 beneath the open end of trap 5 and a pre-determined level 6 of the fluid is maintained in trap 5 by means of a vertically adjustable gate 7 which is slidably mounted at the outlet end of the trap and arranged to be adjustably extended downwardly across the interior of conduit 4 to partially dam the stream of fluid flowing through conduit 4. By maintaining the pre-determined level 6 in the trap, a void space 8 of pre-determined volume will be maintained between fluid level 6 and the upper end of the trap. One or more baffles 9 of any suitable form may be mounted in trap 5 to agitate the fluid passing beneath the trap and thereby aid the separation of gas from the drilling fluid. An orifice nipple 10 of fixed area is mounted on the upper wall of the trap and provides open communication between the atmosphere and void space 8. An outlet nipple 11 is connected to the top of the trap and communicates with void space 8. A pipe 12 is connected at one end to nipple 11 and at the other end to the intake of a vacuum pump 13 of any suitable design having a discharge pipe 14. A flow meter 15 is interposed in pipe 12 to measure the gaseous fluid drawn from the trap by pump 13. A valve 16 is interposed in pipe 12 between nipple 11 and meter 15. A branch pipe 17 communicates with pipe 12 on the downstream side of meter 15 and leads to a gas detector 19, which is preferably of the electric hot filament type of well-known design commonly employed for detecting small amounts of combustible gases in air. Detector 19 is provided with an indicating meter 20 preferably calibrated to indicate the percentage of combustible gas to the gaseous fluids passing through the detector. It will be understood that the detector meter 20 may be of the well-known recording type so as to provide a continuous record of the percentage of gas in the gaseous fluid being analyzed.

A second flow meter 21 is interposed in branch pipe 17 to measure the volume of gaseous fluid flowing through branch pipe 17 to detector 19. A suction pipe 22, having a valve 23 interposed therein leads from detector 19 into pipe 12 at a point intermediate the juncture of branch pipe 17 to pipe 12 and pump 13. A valve 24 is interposed in the portion of pipe 12 between the junctures therewith of branch pipe 17 and suction pipe 22.

Vacuum pump 13 will be operated to draw the gaseous fluid from trap 5 substantially as rapidly as it accumulates therein and will at the same time draw air into void space 8 through nipple 10 for admixture with the gas evolving from the drilling fluid. By appropriate regulation of valves 23 and 24, a suitable proportion of the gaseous fluid will be drawn through detector 19, the remainder being drawn directly to the pump through pipe 12, by-passing the detector. This by-pass arrangement is provided because detectors of the electric hot filament type are normally effective on very small volumes of gas, hence the apparatus arrangement which will permit control of the quantity of gas passing through the detector.

Meter 15 will measure the total quantity of gaseous fluid continuously withdrawn from trap 5 while meter 21 will measure the quantity of gaseous fluid passing to the detector. Detector meter 20 will measure the percentage of gas in the air-gas mixture flowing through detector 19 and from this measurement and the total volume of gaseous fluid drawn from the trap, as measured by meter 15, the volume of gas evolving from the drilling fluid passing through trap 5 per unit of time may be readily calculated.

In ordinary operations, drilling fluid 3 containing the drill cuttings and gas introduced thereby into the fluid will overflow from casing 1 through conduit 4 where it will pass through trap 5 on its way to the settling pits and circulating pumps. As the fluid passes through trap 5 gas will evolve therefrom into void space 8, the evolution of gas being assisted by a slight vacuum maintained in the void space 8 by vacuum pump 13 and by agitation of the fluid by its contact with baffle 9. At the same time by virtue of the reduced pressure maintained in void space 8, a quantity of air will be drawn into the void space through nipple 10 and will be admixed with the evolving gas. By holding constant the metered volume of gaseous fluid withdrawn from the trap, the quantity of air drawn into the trap through nipple 10 will be automatically adjusted in accordance with the volume of gas evolved from the drilling fluid, so that any changes in the rate of evolution of gas from the drilling will be immediately reflected in the subsequent analysis in detector 19. The increments of drilling fluid will be correlated with the depths of the strata to which they relate, in a manner such as described in detail in the afore-mentioned Hayward Patent No. 2,214,674 and a log of the well may thereby be obtained which will, in general, indicate the presence or absence of gas in the strata penetrated by the drill bit.

As noted previously, however, the analysis of the gas by the above-described procedure, while accurately portraying the relative amounts of gas evolving from successive increments of the drilling fluid, does not necessarily bear any significant relationship to the actual quantities of gas in the strata to which the fluid increments are related. The fact that more gas is evolved from one increment of the drilling fluid than from another does not necessarily mean that the gas stratum providing the larger evolution of gas from the related fluid increment is actually a richer gas stratum than the one providing the smaller evolution of gas from its related fluid increment. The quantity of gas evolved depends in part, at least, on the gas-retaining characteristics of the particular drilling fluid employed at the time. The gas evolved from a drilling fluid will be only the excess over the quantity normally retainable by that fluid under any given set of operating conditions. Thus, a particular drilling fluid may have a relatively large gas-retaining property such that even though it traverses a relatively rich gas stratum, the fluid may retain substantially all of the gas introduced therein by the cuttings from the drilling of that stratum, and only a relatively small gas reading will be reflected by the detector which will give the misleading impression that the stratum is substantially devoid of gas. On the other hand, if the drilling fluid has relatively low gas-retaining characteristics, a substantial proportion of the gas introduced therein from a gas stratum of relatively low gas content may evolve in the trap and will give a detector reading indicating, incorrectly, that a rich gas stratum has been penetrated.

Accordingly, I have found that it is important to first calibrate the trap and detector apparatus with various drilling fluids, in order to determine how much gas will be released from each drilling fluid initially having therein a known volume of gas. Having once thus calibrated the trap and detector system for the amount of gas released from such a fluid, then when a fluid of similar characteristics is employed in the drilling of a well, the amount of gas released from each increment of such fluid may be compared with the amounts shown by the calibration test on that fluid to thereby provide a quantitative index of the gas contained in the strata penetrated during drilling.

Calibration of the trap and gas detector system for a particular drilling fluid may be accomplished in the following manner, reference again being made to the drawing:

A known quantity of a suitable chemical which will react with the water or other constituent of the drilling fluid to generate a known volume of gas is introduced into the drilling fluid entering the well. The chemical, which is indicated in the drawing by the numeral 25, will preferably be introduced in the form of a slug or mass of powder initially confined within a bag or casing which is readily soluble or destroyable after a short period of immersion in the drilling fluid so that the mass of the chemical will be brought into direct reactive contact with the drilling fluid shortly after introduction therein. As is well known and as described in the afore-mentioned Hayward U. S. Patent No. 2,214,674, very little lineal intermixing of the increments of the drilling fluid will occur during circulation of the drilling fluid through the well. Hence, the gas generated from chemical 25 will remain within a relatively short lineal increment of the drilling fluid throughout the movement of that increment through the well. By introducing the chemical into the fluid as it enters the well, sufficient time will elapse to complete the gas-generating reaction with the fluid before the increment of the drilling fluid containing the chemical returns to the surface. Since the resulting gas will be present in the fluid during its circulation past the drill, the increment containing the gas will be subjected to all the conditions normally encountered by gas from cuttings during normal operations, thereby making the calibrating conditions fully comparable to normal drilling conditions.

When the increment of the drilling fluid containing the known volume of gas returns to the surface, it will flow through trap 5 in the usual manner and will evolve therein a proportion of the gas initially introduced therein. The evolved gas will be measured as described in order to establish the proportion of gas which will evolve from that drilling fluid containing the known volume of gas. Thereafter, as gas strata are penetrated by the drill, the analysis giving the amount of the evolved gas per unit volume of drilling fluid may be compared with the evolution from the increment containing a known volume of gas per unit volume of the drilling fluid to provide the desired index of the relative richness of the gas strata.

Various chemicals may be used to provide known quantities of gas per unit quantity of the chemical. For example, calcium carbide will react with the water of the drilling fluid to generate acetylene. One pound of calcium carbide will generate about 14.5 cubic feet of acetylene. Magnesium metal will react with hydroxides such as sodium hydroxide usually present in most drilling fluids, to generate hydrogen in the amount of about 14.8 cubic feet per pound of magnesium. Zinc methyl will combine with water to form 7.4 cubic feet of methane per pound of zinc methyl.

From the foregoing it will be seen that the logging method in accordance with this invention comprises circulating through a well being drilled by the rotary method, a drilling fluid having pre-determined gas evolving properties, measuring the volume of gas evolved at the surface from the fluid, and comparing the volumes of evolved gas with the pre-determined gas-evolving properties of the fluid to provide an index of the gas content of gas-containing strata penetrated by the drill.

It will be understood that various alterations and modifications may be made in the details of this invention within the scope of the appended claims but without departing from the spirit of this invention.

What I claim and desire to secure by Letters Patent is:

1. The method of determining the gas-releasing properties of a hydraulic drilling fluid to be employed in the rotary drilling of wells, comprising, introducing into an increment of known quantity of said fluid a known volume of gas, circulating said increment containing said known quantity of gas through a substantially gas-free well to subject said increment to the drilling and circulating conditions encountered in that well, causing gas to evolve from said increment as it returns to the surface, and measuring the amount of the evolved gas to thereby establish a quantitative relation for that fluid between the known volume of gas initially present in the fluid and the amount of gas released by said fluid.

2. The method of determining the gas-releasing properties of a hydraulic drilling fluid to be employed in the rotary drilling of wells, comprising, introducing into an increment of the drilling fluid a quantity of a chemical reactive with constituents of said fluid to generate a known volume of gas in said increment, circulating said increment containing said known quantity of gas through a substantially gas-free well to subject said increment to the drilling and circulating conditions encountered in that well, allowing gas to evolve from said increment as it returns to the surface, and measuring the amount of the evolved gas to thereby establish a quantitative relation for that fluid between the known volume of gas initially present in the fluid and the amount of gas released by said fluid.

3. A method as defined by claim 2 wherein said chemical is calcium carbide.

4. A method as defined by claim 2 wherein said chemical is metallic magnesium.

5. A method as defined by claim 2 wherein said chemical is zinc methyl.

References Cited in the file of this patent

UNITED STATES PATENTS

| | | |
|---|---|---|
| 2,072,872 | Finkelstein | Mar. 9, 1937 |
| 2,214,674 | Hayward | Sept. 10, 1940 |
| 2,328,555 | Hoover | Sept. 7, 1943 |
| 2,341,169 | Wilson et al. | Feb. 8, 1944 |
| 2,589,219 | Bond et al. | Mar. 18, 1952 |
| 2,636,569 | Smith | Apr. 28, 1953 |